United States Patent [19]

Allemand et al.

[11] 4,345,155
[45] Aug. 17, 1982

[54] RADIATION DETECTOR FOR USE IN X-RAY TOMOGRAPHY

[75] Inventors: Robert Allemand, St. Ismier; Michel Laval, St. Martin d'Uriage, both of France

[73] Assignee: Commissariat a l'Energie Atomique, Paris, France

[21] Appl. No.: 81,431

[22] Filed: Oct. 3, 1979

[30] Foreign Application Priority Data

Oct. 13, 1978 [FR] France ................................ 78 29267

[51] Int. Cl.³ .............................................. G01T 1/18
[52] U.S. Cl. .................................................. 250/385
[58] Field of Search ........... 250/374, 375, 385, 445 T; 313/93

[56] References Cited

U.S. PATENT DOCUMENTS

| | | | |
|---|---|---|---|
| 4,119,853 | 10/1978 | Shelley et al. | 250/385 |
| 4,161,655 | 7/1979 | Cotic et al. | 250/385 |
| 4,193,000 | 3/1980 | Shirayama et al. | 250/385 |

Primary Examiner—Davis L. Willis

[57] ABSTRACT

Radiation detector comprising an ionization chamber having at least two juxtaposed electrodes, formed by plates respectively raised to a first potential and to a second potential, said plates being supported at at least one of their upper and lower ends by upper and lower insulating strips, wherein the plates form in the vicinity of the insulating strips baffles which protect the strips against radiation.

6 Claims, 6 Drawing Figures

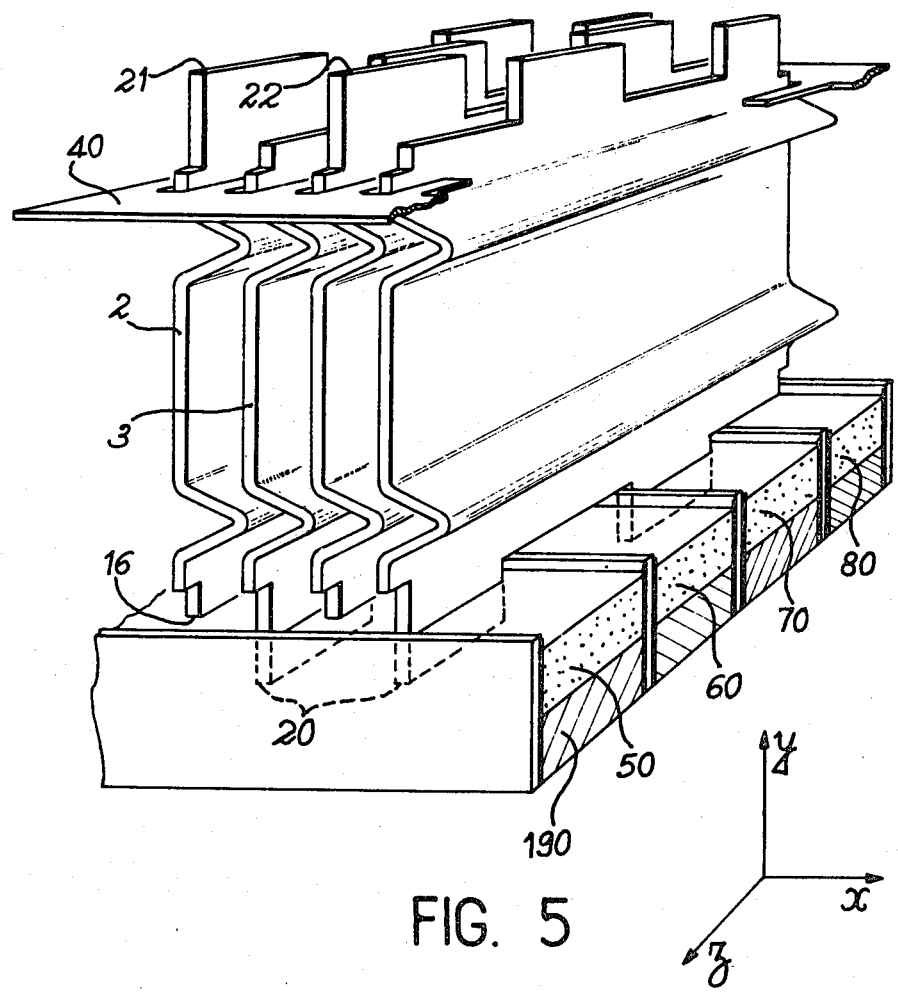
FIG. 5
FIG. 6
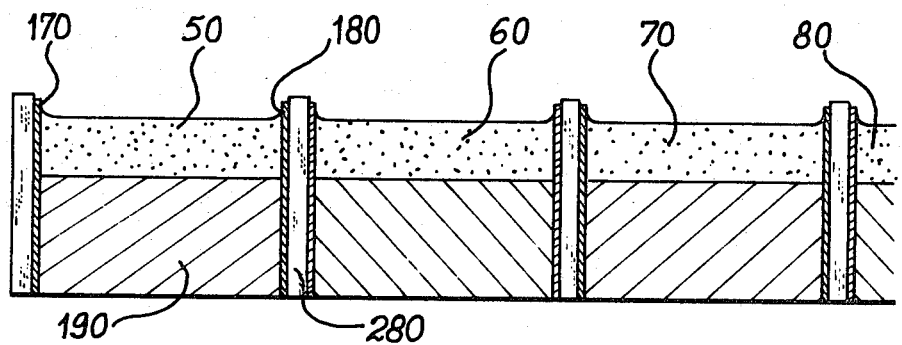

RADIATION DETECTOR FOR USE IN X-RAY TOMOGRAPHY

BACKGROUND OF THE INVENTION

The present invention relates to a radiation detector and in particular for X-ray tomography.

More specifically, the present invention applies to multicellular detectors containing a high pressure gas and which are to be used in tomographic systems which have for example a calculator or computer. In an X-ray tomography apparatus having a computer, the spatial distribution of the intensities of the X-rays which have passed through the object to be visualised in accordance with the sectional plane and in different paths is converted into an electrical signal which is processed so as to make it possible to obtain an image of the object. The detectors used must detect the electromagnetic energy with an adequate spatial resolution. The sampling rate of the signals supplied by the detectors is generally limited by the relaxation time of these detectors. It is therefore necessary to use detectors having low relaxation times, a high sensitivity and a very good spatial resolution. It is known that a multicellular detector having a plurality of spatially separate cells makes it possible to provide an economic and efficient tomography apparatus. In this type of detector, the X-radiation is detected in a gas of high atomic mass under high pressure. The X-photons interact with the gas to produce ion-electron pairs. The electrons are collected on electrodes under the action of an electrical field applied between the electrodes and supply electric currents proportional to the intensity of the X-rays. These electrons are collected on positive electrodes or plates alternating with negative electrodes or plates on which the ions are collected. The electrons and the positive ions which are produced by the interaction of the X-photons and the gas move along lines of force of the electric field and are collected on positive and negative electrodes. All the charges produced by the interaction of the X-rays and the gas must be collected in an as short a time as possible and in particular in a time which is as uniform as possible in the volume of the detection cell, in such a way that the signal corresponding to the following sampling interval is not disturbed.

In general, the positive and negative electrodes are separated by insulants which, unfortunately have a very high sensitivity to X-radiation. This leads to significant stray conduction phenomena. This disadvantage is aggravated by the fact that these phenomena are not quantitatively repetetive and have a significant persistence after irradiation. Moreover, the necessity of increasing the spatial resolution to improve the quality of the image obtained makes it necessary to construct detectors having a very large number of cells. The oldest tomography apparatuses had about 200 detection cells at an angle of 40°. In order to increase the image quality, it is at present necessary to construct apparatuses having 500 or even 1000 cells on the same angle. With a view to significantly decreasing the leakage currents in the insulant separating the electrodes of the detectors it is known that it is possible to use mineral insulants and in particular ceramic insulants. These insulants can be easily worked, are excellent electrical insulators and are dimensionally very stable. However, despite all these qualities, they do not permit the elimination of all the problems caused by leakage currents. The possible improvement of this type of detector consists of eliminating the insulant within the electrode and transferring it to the upper and lower extremities of the electrodes. However, this solution has the disadvantage of making the electrodes less rigid and more fragile, which may lead to the effects of microphony due to a lack of rigidity of the electrodes.

BRIEF SUMMARY OF THE INVENTION

The object of the present invention is to obviate these disadvantages and more particularly to provide a radiation detector in which the current losses in the insulant separating the electrodes and in the connecting terminals of these electrodes with their supply systems and with the ionic or electronic current measuring channels are minimised. Moreover, the device according to the invention makes it possible to increase the rigidity of the electrodes and thus prevent any stray microphony phenomenon.

According to the invention, this problem is solved by a radiation detector constituting an ionization chamber, preferably of the multicellular type comprising at least two juxtaposed electrodes formed by plates brought respectively to a first and a second potential, said plates being supported at at least one of their upper and lower ends by upper and/or lower insulating strips, wherein the plates form in the vicinity of the insulating strips baffle plates protecting the strips against radiation.

According to another feature of the invention, the end of each plate opposite to the end closest to the radiation has a raised edge. According to another feature of the invention the detector has at least two and/or lower strips juxtaposed in the direction of the plates, each strip being covered by a conductive deposit, each end of the plates in the vicinity of the strips being cut in such a way that one strip supports all the plates raised to the first potential and an adjacent strip supports all the strips raised to the second potential and so on depending on the number of strips, the conductive deposit of each strip being raised to the same potential as that of the plate supported by the corresponding strip and being arranged in such a way as to intercept all the field lines liable to be formed between the electrodes or between an electrode and the reference potential.

According to a further feature, the baffles of each plate are formed, in the vicinity of the upper and lower strips, by a moulding parallel to the direction of the radiation and having a V-shaped section, said V projecting on one face of the plate and being retracted on the other plate in such a way that the apex of the projecting V of the moulding on one face of the plate engages in the retracted V of the facing face of the following plate.

BRIEF DESCRIPTION OF THE DRAWINGS

Other features and advantages of the invention can be gathered from the following description, with reference to the attached drawings, wherein show:

FIG. 5 diagrammatically, another embodiment of the detector according to the invention.

FIG. 6 a cross-section through the plate supports for said second embodiment.

DETAILED DESCRIPTION OF THE EMBODIMENTS

Figure 1:
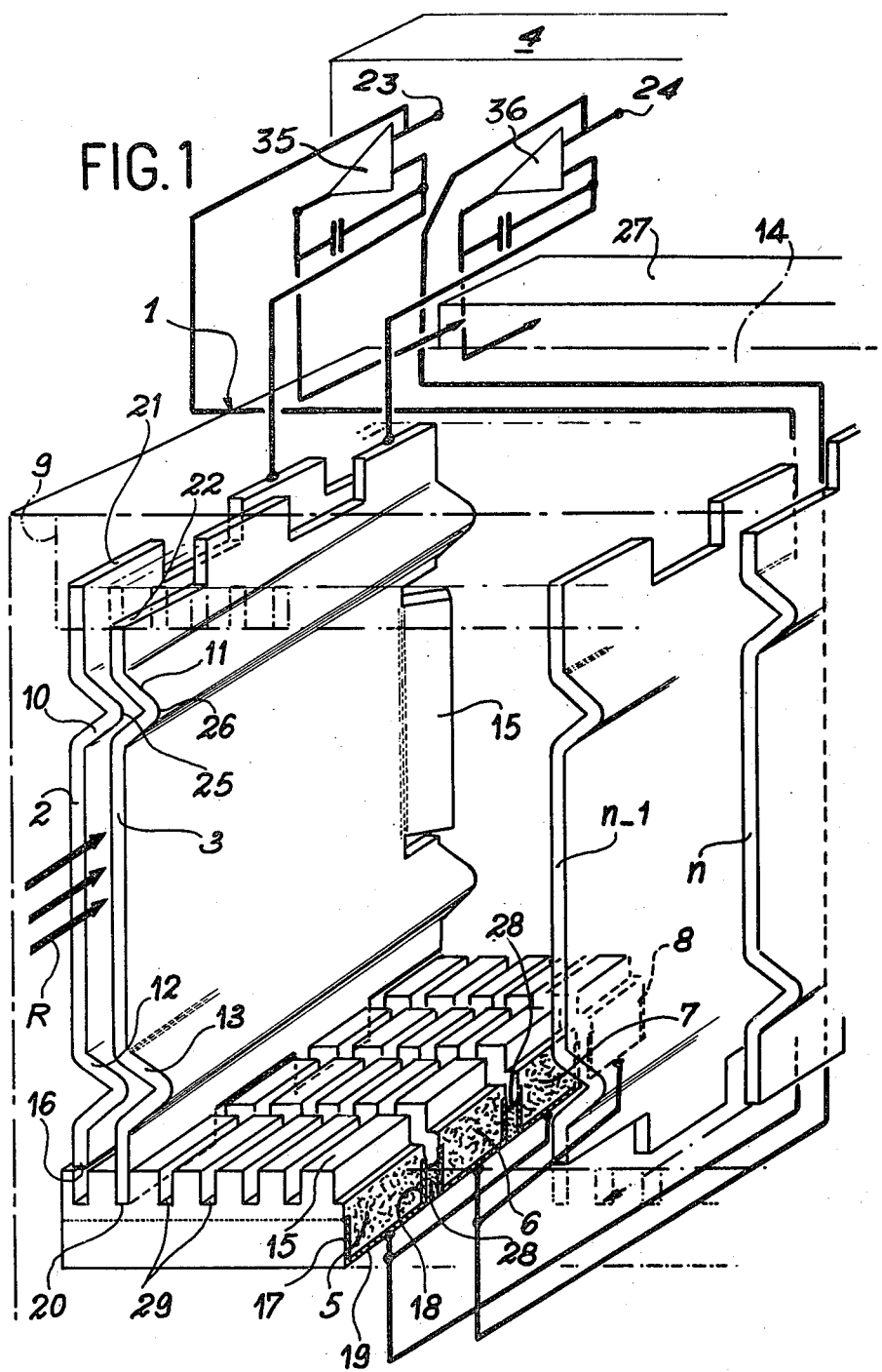
FIG. 1 the radiation detector according to the invention.

FIG. 1 shows a radiation detector according to the invention, which comprises a multicellular ionization chamber having a plurality of electrodes in the form of plates alternately connected to two potential sources. Each cell comprises an electrode, electrodes being positioned on either side and the gas is contained in the gaps formed between said electrodes. The ionization chamber, which is not shown in detail in the drawing, can be filled with pressurized xenon in the case where the radiation R is X-radiation. All the electrodes 2 are brought to, for example, a first positive potential in such a way as to constitute anodes. Electrodes 3 can be brought to a, for example, second negative or zero potential to constitute cathodes. 4 is the electric power source for the various electrodes and is provided across amplifiers 35 and 36. All the electrodes 2 and all the electrodes 3 are supported at their upper and lower ends by insulating strips. On the side of the lower end of the electrodes these insulating strips are designated by the reference numerals 5, 6, 7, 8. On the side of the upper end, these insulated strips are diagrammatically represented at 9. In the vicinity of the insulating strips, the plates constituting the electrodes form baffle plates such as 10, 11, 12, 13. As will be shown hereinafter, these baffle plates serve to protect the strips from X-radiation, which can be emitted in the direction of the insulant of said strips and which could lead to leakage currents in said insulant. On the opposite side to the end receiving radiation R each plate has a raised edge 15, which prevents incident X-rays not completely stopped by the gas between the electrodes from striking the bottom of the ionization chamber. Thus, if the ionization of the gas contained in the chamber takes place close to the bottom thereof, the ions created at this point move slowly and only reach the cathodes several dozen milliseconds after the X-radiation which has brought about their formation. This can lead to a persistence phenomenon, more especially as in this case a fraction of the X-rays is detected outside the uniform electric field zone. Thus, these raised edges provide prevention of any ionization outside the uniform electric field existing between the electrodes. The raised edge makes it possible to intercept virtually all the unused X-rays, whilst also ensuring a better mechanical rigidity of the plates forming the electrodes. Due to this increase in the mechanical rigidity of the plates, the thickness thereof can be considerably decreased. As a result, the number of detection cells contained in the ionization chamber can be considerably increased and in this way the spatial resolution of the detector is increased.

The number of insulating strips supporting the electrodes has been limited to four in the drawing in order to simplify it. These strips are partly sectionalized on one face 15 facing the corresponding end 16 of the plates in such a way as to support the upper and lower ends of said plates and to separate them by insulating sections. Each of the strips is covered by a conductive deposit 19 on a face opposite to face 15 facing the end of the plates. This metal deposit also partly covers the sides 17, 18 of the strips adjacent to the face of the strip covered by conductive deposit 19. The ends 16, 20, 21, 22, etc of the plates located in the vicinity of the strips are cut in such a way that strip 6 for example supports all the plates 2 raised to the first positive potential 23 and an adjacent strip such as 5 supports all the plates 3 raised to the second negative potential 24. In the same way, in the embodiment shown in FIG. 1, the strip 8 supports all the plates 2 raised to the first positive potential 23. The metal deposits such as 17, 18,19 covering the strips are raised to the same potential as that of the plate supported by the corresponding strips. Thus, in the present embodiment, the metal deposits 17, 18, 19 covering strip 5 and the metal deposit covering strip 7 are raised to the same potential as that of the corresponding plates 3, i.e. to the second potential 24. In the same way, the metal deposits covering strip 8 are raised to the same potential as that of plates 2, i.e. to potential 23. Thus, as a result of cutting the ends of the plates in the vicinity of the strips, as is clearly shown at 21, 22, each plate is correctly fixed to the strips and is insulated from the following plate. As will be readily apparent hereinafter, the metal deposits covering each of the strips make it possible to reduce the leakage currents in the insulant of the strips. This reduction results from the presence of the conductive metal deposit which creates a guard ring system in the vicinity of the end of each of the strips.

The baffle plates such as 10, 11, 12, 13 have a V-shaped section which projects on one face of each plate and is retracted on the other face, in such a way that the apex 25 of the projecting V on one plate engages in the base 26 of the retracted V on the following plate, in order to completely obstruct the gap between the two plates.

In a non-detailed manner, it is also possible to see the means 27 which are able to collect and process the signals coming from the different electrodes. These signals make it possible to visualize the section of an organ located in front of the detector and which is traversed by the X-rays. After partial absorption by the organ, the X-rays strike the detector. Means 27 permitting said visualisation are well known in the art and are not shown in detail here.

Figure 2:
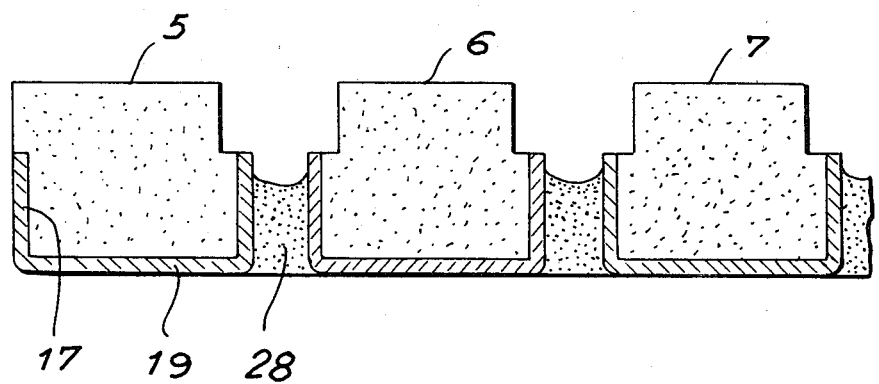
FIG. 2 a cross-section through the strips supporting the plates.

FIG. 2 is a cross-section through the strip supporting the plates at one of their ends.

The different insulating strips are rendered integral by means of insulating layers of epoxy resin, such as layer 28. These resin layers have a level which is below the edge of the conductive deposits 17, 18, in such a way that the resin is not in contact with the insulating strips 5, 6, 7, 8. The detector can be fitted in the following way. Each of the strips is covered by conductive deposits 17, 18, 19 constituted for example by a silver paint, then the different strips are interconnected by means of epoxy resin layers 28. Finally, the strips are partly sectionalized by grooves such as 29 after which the correctly cut plates are fitted to the thus formed upper and lower supports formed by this assembly of grooved strips. It is obvious that the positioning grooves for each plate could be made before the gluing of the strips. In this case, the strips only have grooves facing the plates which they support.

Figure 3:
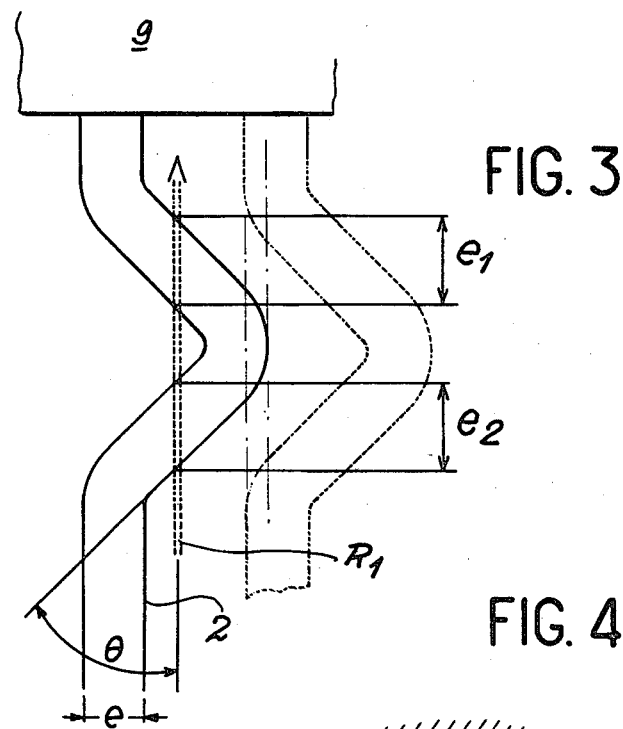
FIG. 3 a diagram providing a better understanding of the function of the baffle plates formed by the plates in the vicinity of the insulating strips.

FIG. 3 shows one of the baffles 10 of plate 2, for example. This baffle has the shape of a V-like moulding and extends in the direction of radiation R parallel to the plane formed by the faces of the strips supporting the plates. At 9 is diagrammatically shown one of the strips located in the vicinity of said end of plate 2. X-rays not following the path of the incident rays R can be emitted in direction $R_1$ towards strip 9 supporting the electrodes. This emission can either result from a diffusion of certain rays in the gas contained in the chamber or from a fluorescence of the detection gas. Only a small number of X-rays are diffused in the gas, but they have a high energy. However, the fluorescence X-rays are very numerous, but have a low energy. The diffused or fluorescence rays are completely stopped by the baffle plates. Thus, if $\theta$ is the angle of incidence of a stray ray with the branches of the V of baffle plate 10, the total thickness $e_t$ to be traversed by the X-ray level with the baffle would be equal to the sum of the distances $e_1$ and $e_2$ traversed by said ray in the mass of plate 10. It is therefore possible to write $e_t = e_1 + e_2$ and, by approximation, $e_t = (2e)/(\sin\theta)$, if e designates the thickness of plate 2. Thus, the diffused or fluorescence X-rays cannot reach the insulating strip 9 due to the considerable total thickness $e_t$ of the plate at the point in question. The baffle-type configuration in the vicinity of the insulating strips thus prevents the fluorescence or diffused X-rays from reaching the insulating strips and thus prevents the appearance of leakage currents in said strips.

Figure 4:
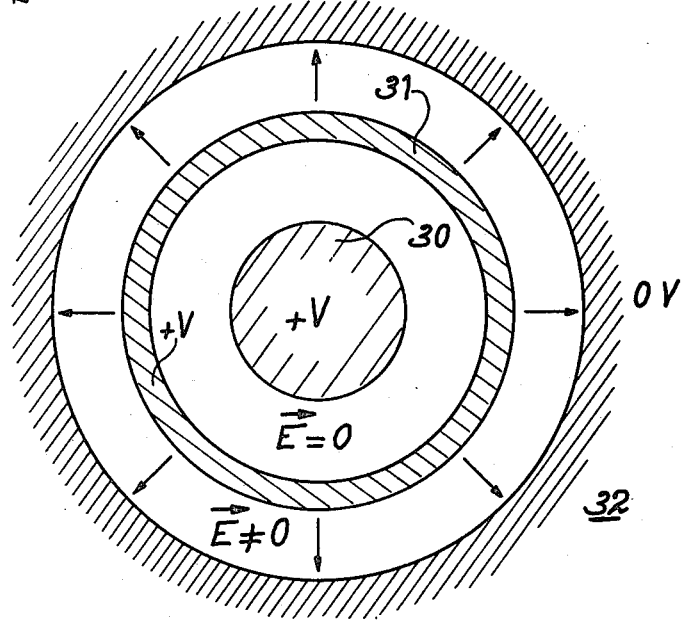
FIG. 4 provides a better understanding of the function of the conductive deposit formed on the insulating strips.

FIG. 4 illustrates the operating principle of a guard ring in the electrostatic field. It is assumed that a central conductor 30 is raised to a potential $+V$ relative to a reference potential. This central conductor is surrounded by another conductor 31 raised to potential $+V$ relative to the reference potential. The reference potential is that of the external mass 32, assumed to be at a potential of 0 volts. The coaxial conductor 31 is insulated from the central conductor 30. The coaxial conductor serves as a guard ring for the central conductor, because the electric field E between said central conductor and the guard ring is 0. Thus, the central conductor and the coaxial conductor are raised to the same potential relative to the reference potential of the external mass and a non-zero electric field only appears outside the guard ring between the latter and the external mass 32. As a result of this principle, on referring to FIG. 1 the conductive layer, raised to the same potential as that of the electrodes supported by the corresponding strip, serves as a guard ring for said electrode. The electric field is therefore 0 between the electrodes 3, carried by strip 5 and conductive layer 19 in the embodiment of FIG. 1.

In the same way, the electric field is 0 between the conductive layer covering strip 6 and electrodes 2, between the conductive layer covering strip 7 and electrodes 3, and between conductive layer covering strip 8 and electrodes 2. Consequently, no leakage current appears either in the insulant of the strips, or between the electrodes raised to different potentials, or between each electrode and the reference potential.

In the embodiment described hereinbefore, the insulating strips can be realised in ceramic members, which are excellent electrical insulants, dimensionally very stable and easily machinable with a conventional tool. The electrodes are preferably made from a dense material having a high atomic number in such a way as to constitute a good shield against the X-rays between each cell. This material can for example be tungsten.

As a result of the detector described hereinbefore, it is possible to achieve the objects indicated hereinbefore, namely preventing any leakage current in the insulant supporting the electrode, preventing any persistence phenomenon to the rear of the electrodes, ensuring a good mechanical rigidity of said electrodes and providing a detector with 500 and even 1000 detection cells at an angle of 40°.

FIG. 5 diagrammatically shows another embodiment of the detector according to the invention. FIG. 6 shows the supports of the plates of said second embodiment in cross-sectional form. According to the second embodiment, the insulating strips 5, 6, 7 and 8 of FIG. 1, which were for example made from a ceramic material, are replaced by insulating resin castings 50, 60, 70, 80.

Conductive layers 17, 18, 19 and resin layer 28 are replaced by copper layers 170, 180, a conductive bar 190 and for example epoxy glass plates 280. The conductive layers 170, 180 and the metal bar 190, as hereinbefore, serve as a guard ring about the insulating strips, here constituted by the insulating resin castings 50, 60, 70, 80.

The construction of the supports of the plates in the embodiments shown in FIGS. 5 and 6, makes it possible to simplify the fitting of the detector. Thus, in the embodiment of FIG. 1, the precision necessary for the positioning of the plates necessitates an onerous machining of the ceramic insulating strips. In the embodiment of FIGS. 5 and 6, the ceramic strips are replaced by filled or unfilled e.g. epoxy resin. The positioning and maintaining in place of the plates are assured by an external fitting such that the resin is not polymerized. This external fitting is partly shown at 40 in FIG. 5. It is constituted by a template 40 which makes it possible to maintain the spacing between the plates in the direction Ox during the polymerization of the resin. Other templates, not shown in the drawing and supported on shoulders located at the ends of the strips, make it possible to position the plates in directions Oy and Oz during the polymerization of the resin.

Plate 280, made from epoxy glass and which supports the copper layers 170,180 fulfils the same function as resin layer 28 in FIG. 2. The positioning accuracy of the plates results from template 40, those slots can be made as a result of very accurate photographic methods such as photogravure or electrodeposition.

For ease of representation, plates 2 and 3 appear flat in the drawing, but they could also have, as in the previous embodiment, raised edges and baffles.

What is claimed is:

1. A radiation detector comprising an ionization chamber having at least two juxtaposed electrodes, formed by plates respectively raised to a first potential and to a second potential, said plates being supported by insulating strips, wherein the plates form in the vicinity of the insulating strips baffles which protect the strips against radiation.

2. A detector according to claim 1, wherein the baffles of each plate are constituted, in the vicinity of the strips, by a moulding parallel to the radiation direction and having a V-shaped section, said V projecting on one face of the plate and being retracted on the other face in such a way that the apex of the projecting V of the moulding on one face of the plate engages in the retracted V of the facing face of the following plate.

3. A radiation detector comprising an ionization chamber having at least two electrodes parallel to the radiation propagation direction formed from plates raised respectively to a first potential and to a second potential, wherein the end of each plate most remote from the radiation has a raised edge.

4. A detector according to claim 3, wherein the raised edges of each plate block the path of the radiation propagating in the gap separating said plate from an adjacent plate.

5. A radiation detector comprising an ionization chamber having at least two juxtaposed electrodes, formed by plates raised respectively to a first potential and to a second potential, said plates being supported by insulating strips, each strip being covered by a conductive deposit, each plate in the vicinity of the strips being cut in such a way that one strip supports all the plates raised to the first potential and an adjacent strip supports all the strips raised to the second potential and so on depending on the number of plates, the conductive deposit of each strip being raised to the same potential as that of the plate supported by the corresponding strip and being arranged in such a way as to intercept all field lines liable to be formed between the electrodes or between an electrode and a reference potential.

6. A detector according to claim 5, wherein the adjacent strips are mechanically interconnected by an electrically insulating glue.

* * * * *